US008387223B2

(12) United States Patent
Smith

(10) Patent No.: US 8,387,223 B2
(45) Date of Patent: Mar. 5, 2013

(54) METHOD OF CONVERTING A HYBRID SEDAN INTO A HYBRID LIVERY VEHICLE

(76) Inventor: Cabot Smith, Haverhill, MA (US)

( * ) Notice: Subject to any disclaimer, the term of this patent is extended or adjusted under 35 U.S.C. 154(b) by 574 days.

(21) Appl. No.: 12/584,249

(22) Filed: Sep. 3, 2009

(65) Prior Publication Data

US 2011/0047771 A1    Mar. 3, 2011

(51) Int. Cl.
*B23P 17/04*    (2006.01)
(52) U.S. Cl. .......................... 29/401.1; 29/428
(58) Field of Classification Search ............. 29/401.1, 29/897.1, 464, 428
See application file for complete search history.

(56) References Cited

U.S. PATENT DOCUMENTS

| 1,310,425 | A | * | 7/1919 | McIntyre | 296/26.08 |
|---|---|---|---|---|---|
| 4,014,585 | A | * | 3/1977 | Earnhart | 296/16 |
| 4,099,313 | A | * | 7/1978 | Phillips | 29/401.1 |
| 4,231,144 | A | * | 11/1980 | Bernacchia, Jr. | 29/401.1 |
| 4,282,641 | A | * | 8/1981 | Phillips | 29/416 |
| 4,342,146 | A | * | 8/1982 | Hanson | 29/416 |
| 4,369,559 | A | * | 1/1983 | Phillips | 29/401.1 |
| 4,457,555 | A | * | 7/1984 | Draper | 296/181.4 |
| 4,514,891 | A | * | 5/1985 | Draper | 29/401.1 |
| 4,567,636 | A | * | 2/1986 | Draper et al. | 29/401.1 |
| 4,570,321 | A | * | 2/1986 | Draper | 29/401.1 |
| 4,589,181 | A | * | 5/1986 | Phillips | 29/401.1 |
| 4,654,946 | A | * | 4/1987 | Phillips | 29/401.1 |
| 4,662,052 | A | * | 5/1987 | Draper | 29/401.1 |
| 4,766,660 | A | * | 8/1988 | La Rose | 29/401.1 |
| 6,390,537 | B1 | * | 5/2002 | DiGonis | 296/181.1 |
| 6,470,549 | B1 | * | 10/2002 | Mlakar | 29/401.1 |
| 2010/0059953 | A1 | * | 3/2010 | Ben-Ari et al. | 280/80.1 |
| 2010/0207425 | A1 | * | 8/2010 | Ben-Ari et al. | 296/187.07 |
| 2011/0079454 | A1 | * | 4/2011 | Maguire et al. | 180/65.25 |
| 2011/0083309 | A1 | * | 4/2011 | Kshatriya | 29/401.1 |

* cited by examiner

*Primary Examiner* — Essama Omgba
(74) *Attorney, Agent, or Firm* — Lambert & Associates; Gary E. Lambert; David J. Connaughton, Jr.

(57) ABSTRACT

A method of converting production hybrid motor vehicles into hybrid livery motor vehicles. In a preferred embodiment, a production hybrid sedan motor vehicle is extended in length to meet with livery requirements, wherein said extension can be performed either at the center section of said vehicle, thereby providing additional room for the installation of a partition in taxi applications, or by extending the rear door section, thereby providing additional legroom for limousine or corporate vehicle applications. The resulting extended hybrid sedan, possessing an augmented passenger cargo compartment, can be utilized as a hybrid livery motor vehicle comprising reduced carbon emissions and superior gas mileage and brilliantly suited for urban employment.

2 Claims, 8 Drawing Sheets

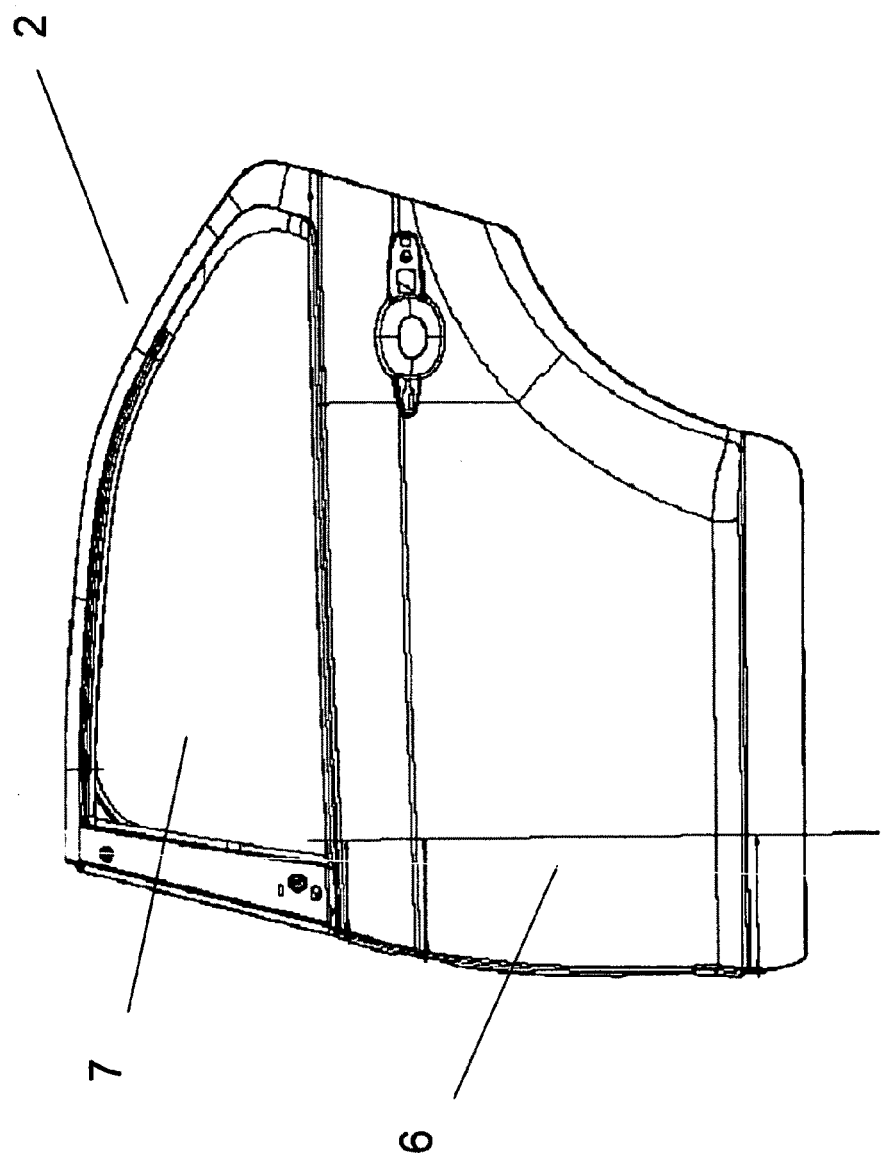

METHOD OF CONVERTING A HYBRID SEDAN INTO A HYBRID LIVERY VEHICLE

BACKGROUND OF THE INVENTION

1. Field of the Invention

The present invention relates generally to a method of converting a motor vehicle into a livery motor vehicle, and more particularly, to a method of converting a production hybrid motor vehicle into a hybrid livery motor vehicle.

2. Description of the Related Art

The livery industry is a multibillion dollar industry comprised of a plurality of motor vehicles, operators, as well as a plethora of passengers from across United States and around the world. The livery motor vehicle, with its extended passenger compartment, is a crucial component of this industry, and the method of converting production motor vehicles into extended livery motor vehicles is well known in the art.

As a result of recent environmental concerns, government agencies as well as a number of private corporations have pushed for a reduction of carbon emissions. The livery industry, with its millions of motor vehicles across the United States and around the world is a major contributor of global carbon emissions. For this reason, as well as out of energy independence concerns, the livery motor vehicle industry has recently come under heavy pressure to make the switch toward a cleaner and more energy efficient transportation solution. The livery motor vehicle industry in turn has answered the "switch to green" call by experimenting with alternate fuel sources such as Compressed Natural Gas (CNG) and Propane, which the industry has implemented in their LINCOLN TOWN CAR™ and MERCURY GRAND MARQUIS™ fleet. Unfortunately, the reduction in carbon emissions resulting from implementing these technologies has come at a price of a roughly twenty percent increase in fuel consumption, and consequently this approach has proven ineffective in meeting the aforementioned environmental and energy independence concerns.

The present invention relates to a method of manufacturing a low carbon emission, and highly energy efficient hybrid livery motor vehicle, by extending from three to twelve inches the wheelbase of production hybrid motor vehicles, thereby increasing the passenger compartment size, an essential requirement to meet the needs of the taxi, limousine, corporate transportation and other livery industries.

The present method can be utilized on any production hybrid vehicle, and meets or exceeds: Original Equipment Manufacturer (OEM) Standards, Federal Motor Vehicle Safety Standards (FMVSS), as well as Environmental Protection Agency (EPA) Emission requirements. Additionally, the present method allows one skilled in the art to either elongate the vehicle in the mid-section, to produce a hybrid taxi motor vehicle, or to elongate the vehicle at the rear door, to produce a limousine motor vehicle.

SUMMARY OF THE INVENTION

The instant invention, as described further herein, imparts a method of converting a production hybrid motor vehicle into a hybrid livery motor vehicle, wherein said livery motor vehicle produces less carbon emissions, and provides far greater gas mileage than traditional, non-hybrid, livery motor vehicles. The instant invention as illustrated herein, is neither anticipated, nor rendered obvious or present in any of the prior art methods, neither alone nor in any combination thereof.

A primary object of the instant invention is to provide a method for converting a production hybrid motor vehicle into a low carbon emission and energy efficient hybrid livery motor vehicle.

Another object of the instant invention is to provide a method for converting a production hybrid motor vehicle into a hybrid livery motor vehicle, wherein said motor vehicle provides additional passenger cargo space.

Another object of the instant invention is to provide a method for converting a production hybrid motor vehicle into a hybrid livery motor vehicle, wherein said motor vehicle's additional passenger cargo space, provides passengers with an additional level of comfort.

Another object of the instant invention is to provide a method for converting a production hybrid motor vehicle into a hybrid livery motor vehicle, wherein said motor vehicle's additional passenger cargo space, facilitates the installation of a partition to be used in taxi motor vehicle application.

Another object of the instant invention is to provide a method for converting a production hybrid motor vehicle into a hybrid livery motor vehicle, wherein said motor vehicle's additional wheel base provides enhanced handling and road stability during operation.

There has thus been outlined, rather broadly, the more important features of the method of converting a production hybrid motor vehicle into a hybrid livery motor vehicle in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are used for descriptive purposes, and should not be regarded as limiting.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 8 illustrates the cut lines for a long glass version door extension.

DETAILED DESCRIPTION OF THE PREFERRED EMBODIMENTS

Figure 1:
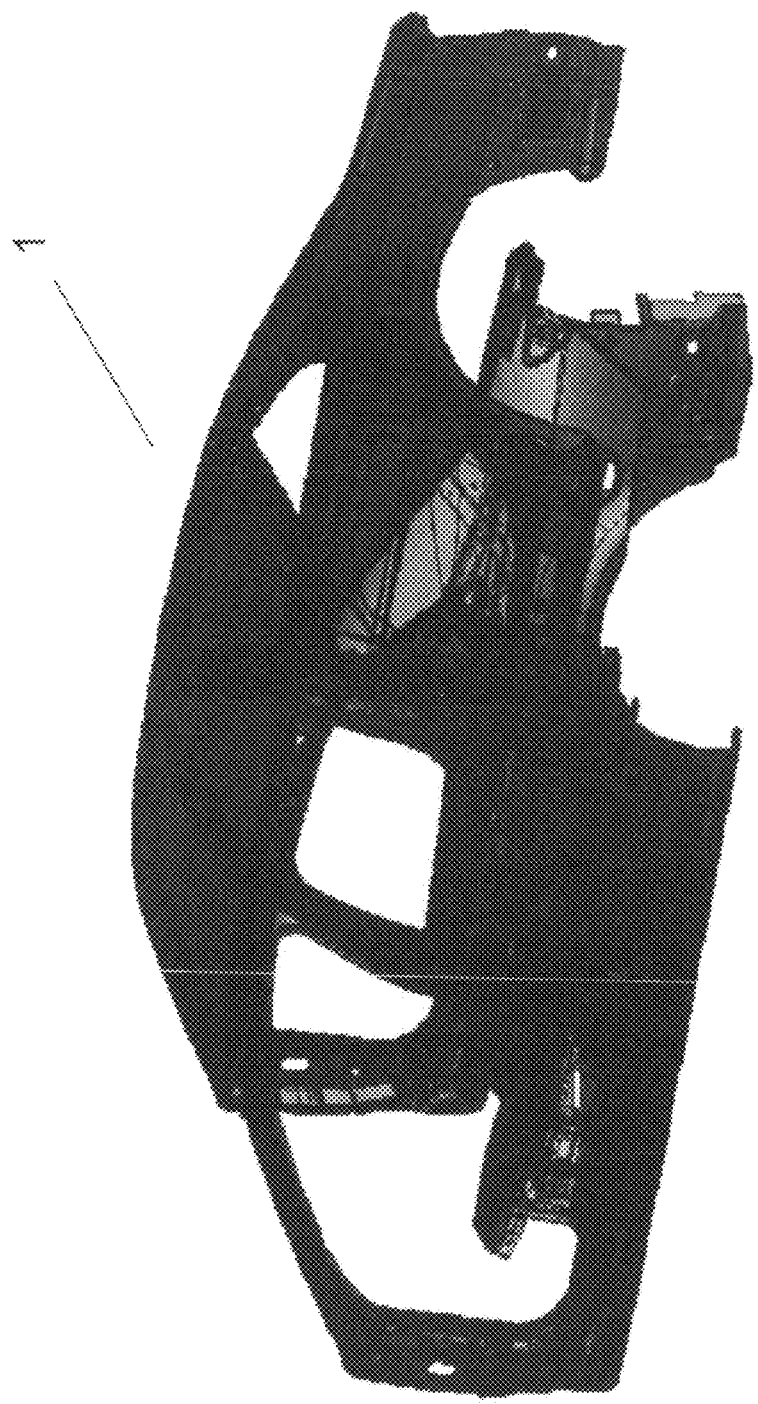
FIG. 1 illustrates standard body before extension is added.
Figure 2:
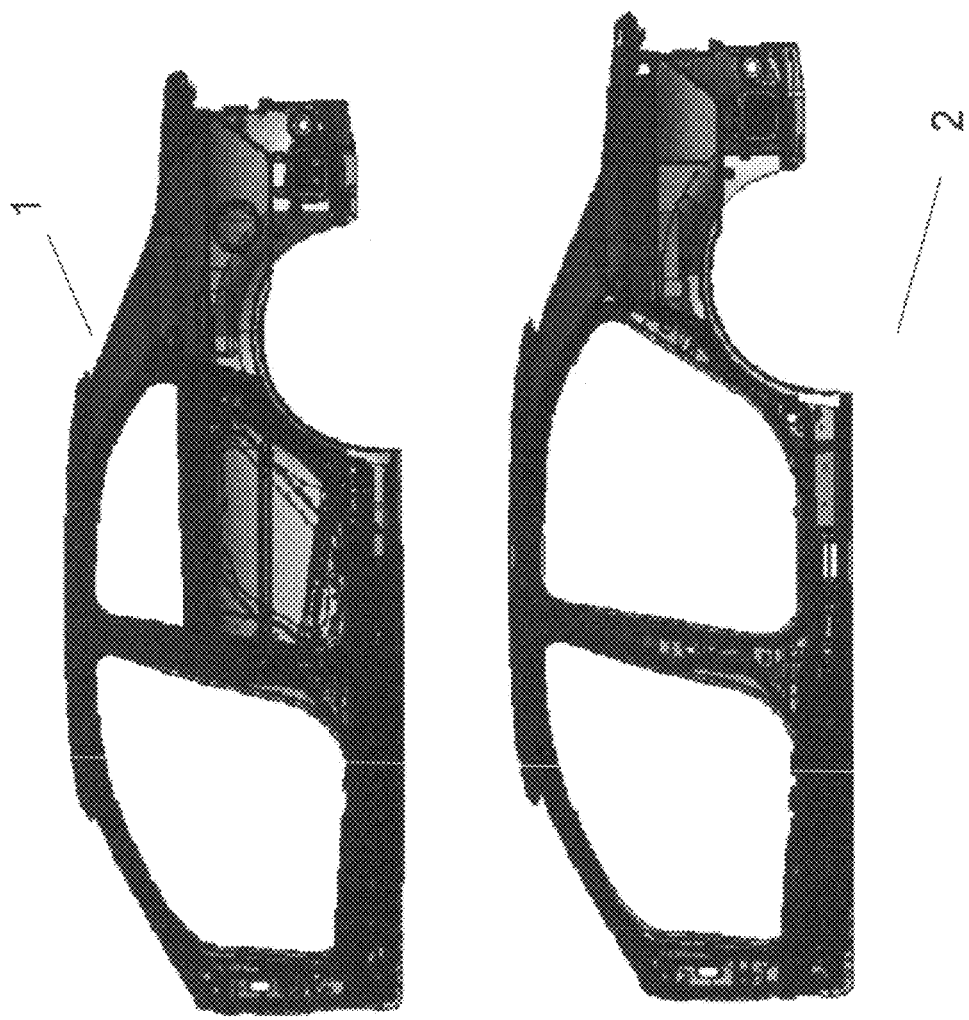
FIG. 2 illustrates comparison of the standard hybrid vehicle on top and extended body version on bottom.
Figure 3:
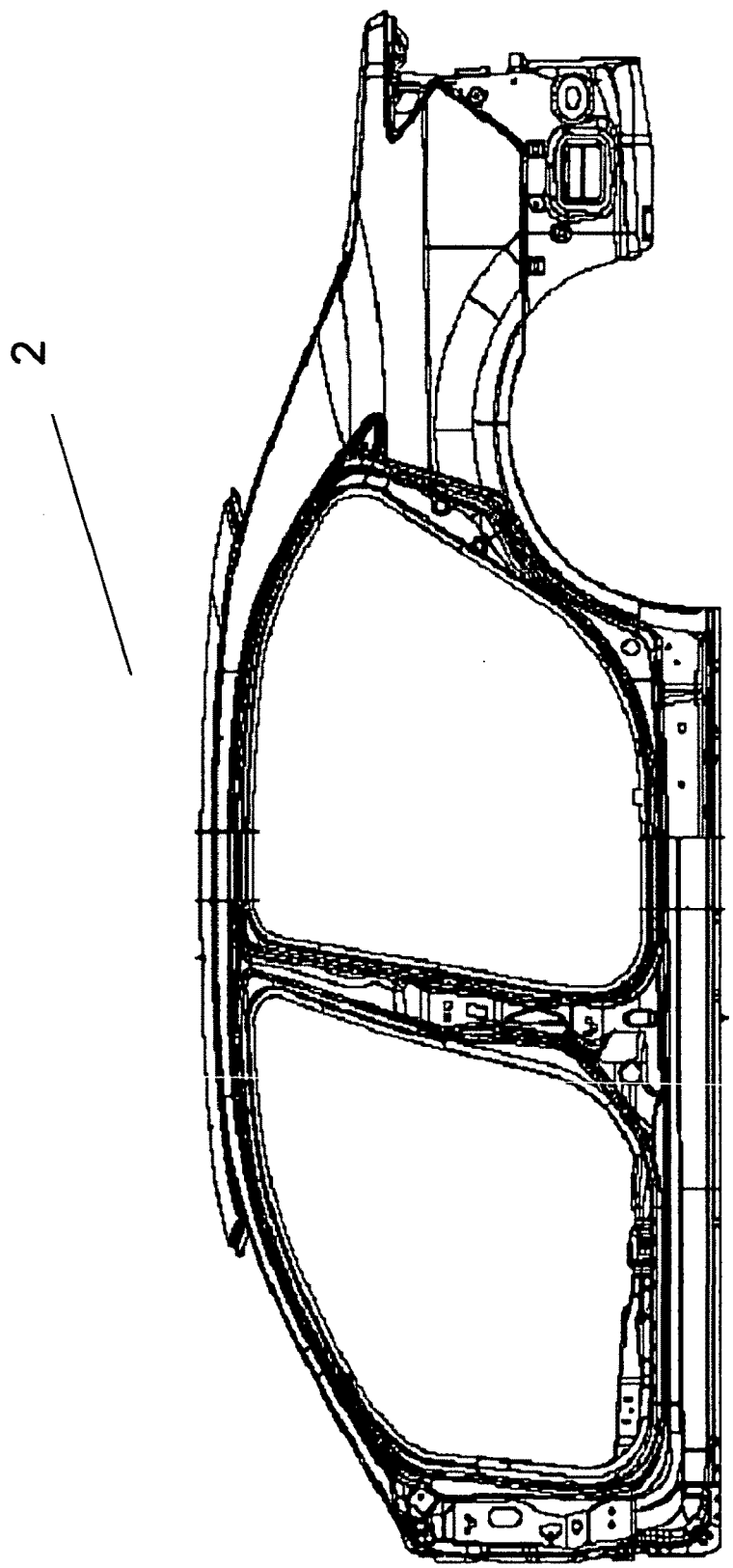
FIG. 3 illustrates full car body with six inch extension.
Figure 4:
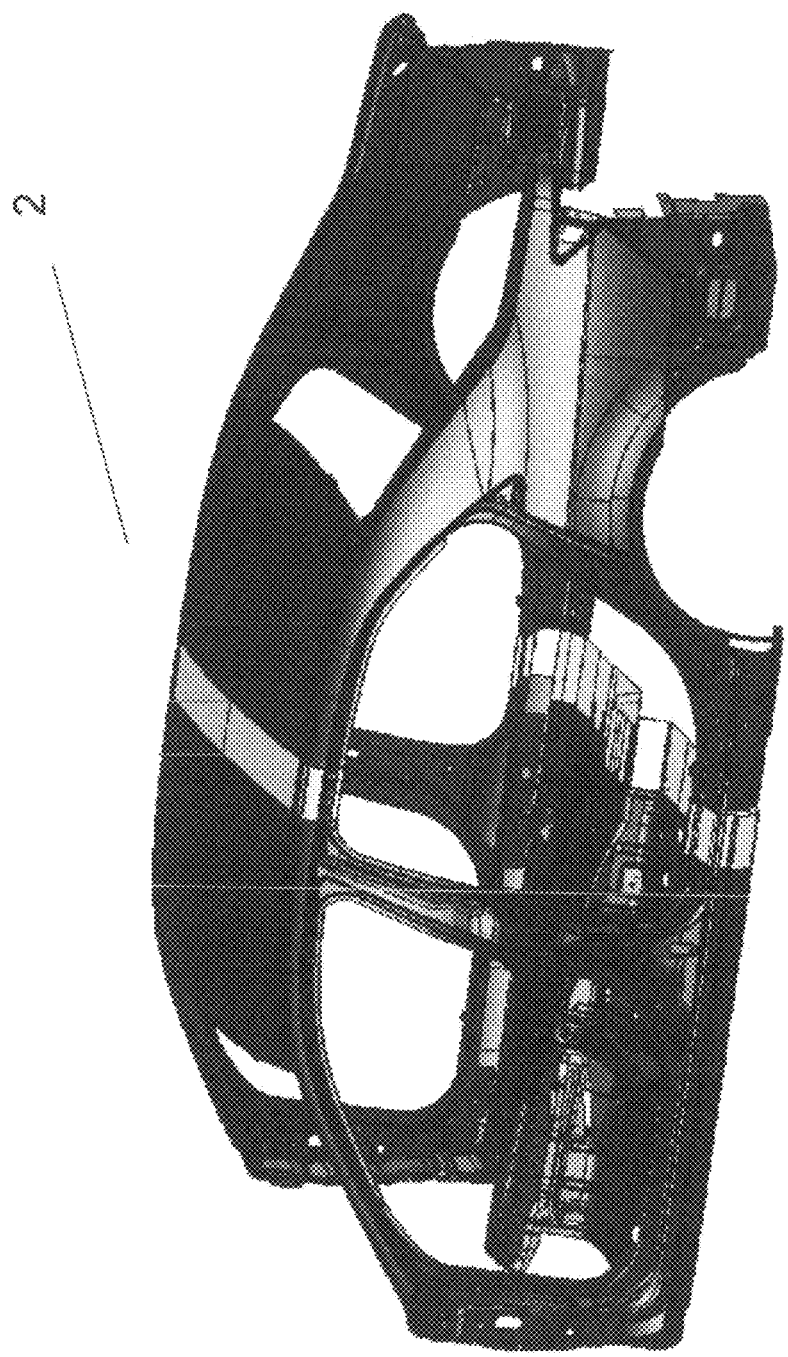
FIG. 4 illustrates the body showing six inch extension added.
Figure 5:
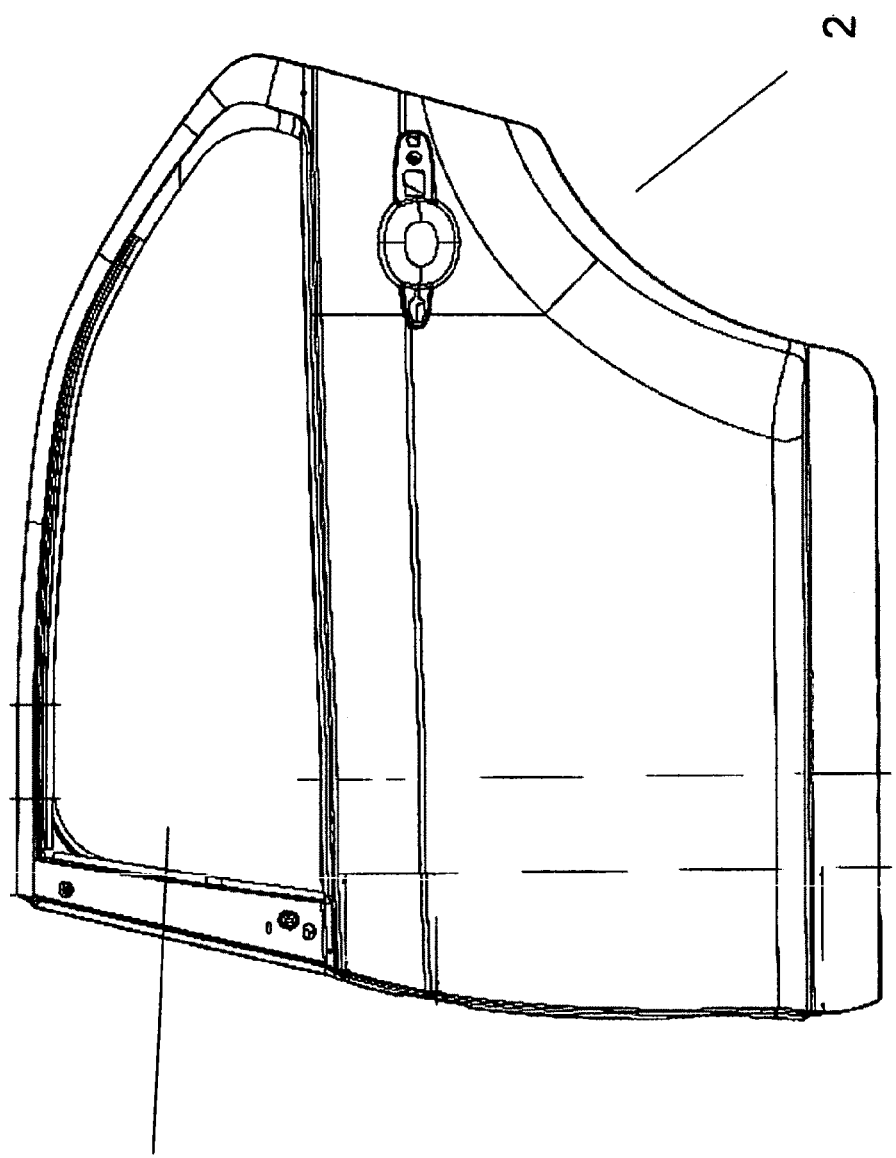
FIG. 5 illustrates extended door with six inch extension added for extended glass.
Figure 6:
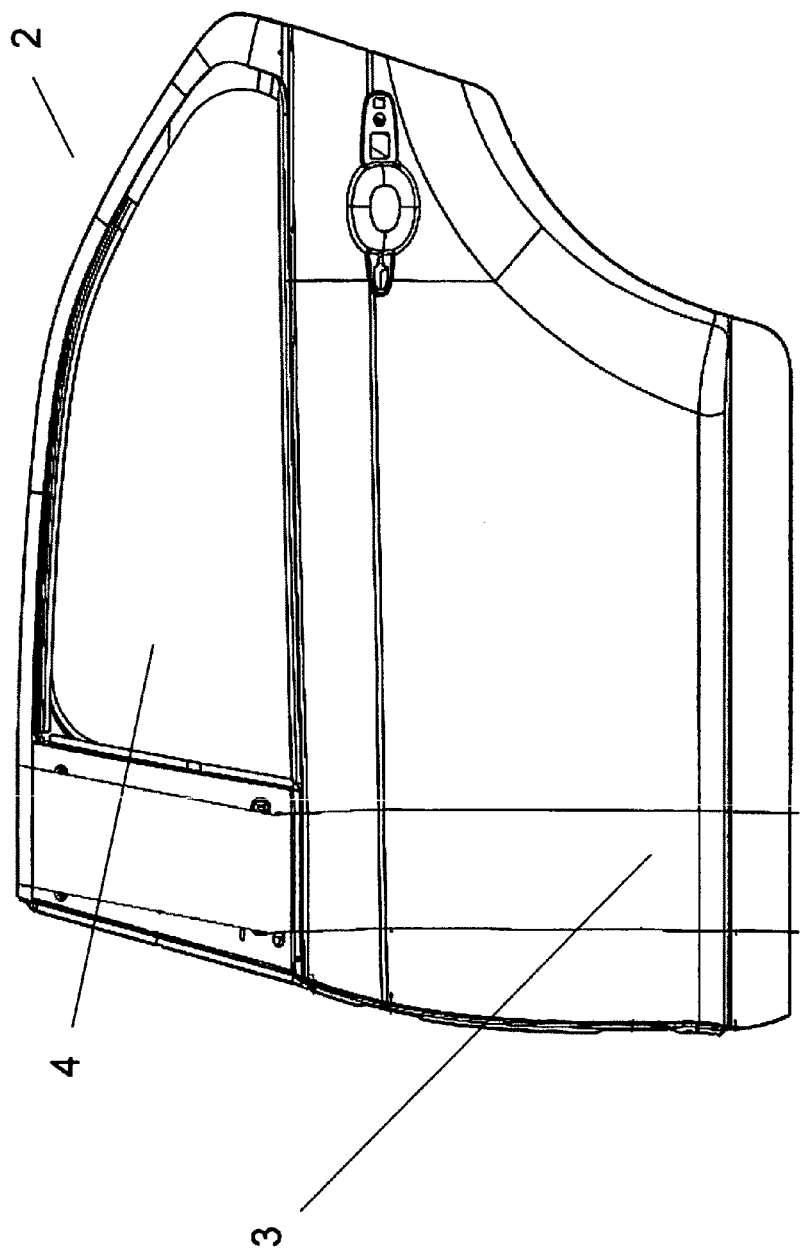
FIG. 6 illustrates the extended door with six inch extension added for OEM glass version.
Figure 7:
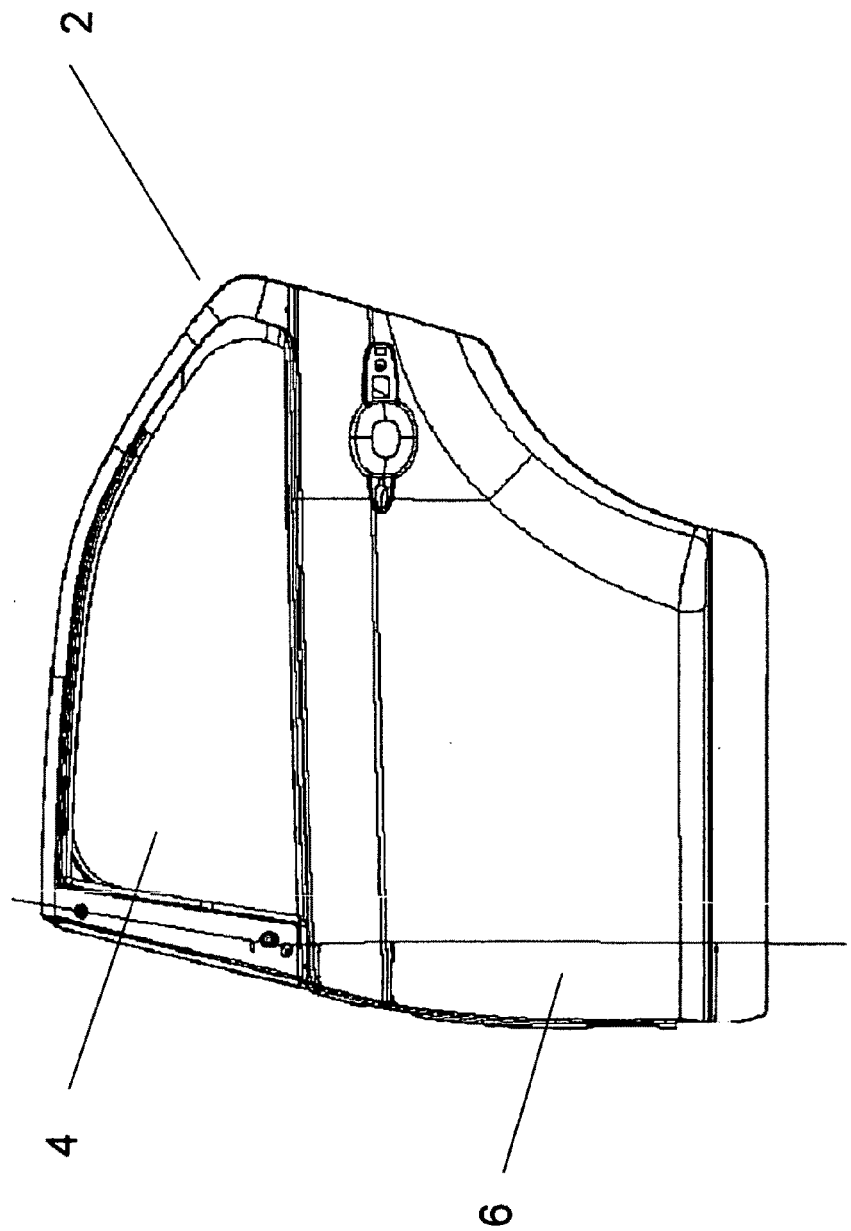
FIG. 7 illustrates cut lines for an OEM glass door extension.

FIG. 1 illustrates standard body 1 before extension is added. FIG. 2 illustrates comparison of the standard hybrid vehicle 1 on top and extended body 2 version on bottom. FIG. 3 illustrates full car body 2 with six inch extension. FIG. 4 illustrates the body 2 showing six inch extension added. FIG. 5 illustrates extended door 2 with six inch extension added for extended glass 5. FIG. 6 illustrates the extended door 2 with six inch extension 3 added for OEM glass 4 version. FIG. 7 illustrates cut lines 6 for an OEM glass 4 door extension 2. FIG. 8 illustrates the cut lines 6 for a long glass version 7 door extension 2.

Below is described the method for standard conversion operations for and the standard operation description for design input/output and particularly a Hybrid L type vehicle as follows:

1. When designing vehicles interiors and exteriors consider the following standards must be met
   A. Vehicle must meet all FMVSS requirements.
   B. Converted vehicle must not exceed OEM GVWR.
   C. Converted vehicle must not exceed OEM GAWR
   D. Converted vehicle must not exceed maximum additional weight allowed by EPA
   E. Fastener systems must meet or exceed minimum standards for type size and corrosion resistance.
   F. Fastener locations must preclude the likelihood of fuel system component puncture during vehicle impact.
   G. Conversion wiring systems must meet all standards for automotive low voltage and high voltage systems.
   H. Conversion wiring systems must be protected with automotive over-current protection devices which are clearly marked with maximum replacement sizes.
   I. Routings and attaching points for components must be designed to assure adequate clearance from adjacent hot, sharp or moving parts.
   J. Serviceability must be optimized in all conversion designs.
2. When validating design results the following conditions must be met.
   A. All added components must be functional
   B. All design clearances must meet appearance requirements and not cause squeaks and rattles.
   C. The conversion authentication document is sent for vehicles which fall within the specified requirements.

Process Sheet Strip
Stretch Length Hybrid L
Standard Operation Description
1. Wash complete car in the car wash
2. Shammy car where not completely dry from car wash
3. Put all door windows down
4. Pull front seats forward
5. Remove key from ignition & disconnect battery
6. Cordan off the car with four orange cones
7. Drop rear seat back down
8. Unplug service disconnect from drive battery
9. Unplug remaining wire from drive battery
10. Unbolt drive battery
11. Remove drive battery, tag stock # and store
12. Remove the orange cones from around the vehicle
13. All nuts—bolts and screws to be placed in bin—put in trunk if not noted
14. Remove left and right kick panels—place in trunk
15. Remove –b—pillar covers (left+right)—place in trunk
16. Remove bottom of rear seat tag stock#—put in storage
17. Remove top of rear seat tag stock#—put in storage
18. Remove nuts from seats and seat belts
19. Remove all seats and tag stock# and put in storage
20. Remove nuts from shoulder harness
21. Remove upper pillar covers left and right—place in trunk
22. Remove bolts from shoulder harness
23. Remove screws from overhead grab handles
24. Remove screws from front overhead vanity mirrors—place in box
25. Unplug 2 rear overhead grab handles—place in box
26. Unplug 2 front vanity mirrors—place in trunk
27. Remove headliner complete through right front door—tag for storage
28. Unplug dome light harness—tag—place in electrical storage area
29. All nuts, screws, seat belts, grab handles, place in box and put in trunk
30. Remove carpet—tag stock# and place in storage
31. Unplug OEM wiring
32. Remove rear deck—place in trunk
33. Remove 2 rear door panels—left+right—place in trunk and put bulbs in box
34. Remove 2 front step plates—left+right—place in trunk
35. Tape, cover rear door glass
36. Using 3m tape all window chrome on doors
37. Use vinyl covers on front interior door panel+glass use 3m tape
38. Cover dash with vinyl cover using 3m tape
39. Cover hood, fenders and trunk lid with american biltrite auto wrap
40. Using vinyl—cover complete front of car with 3m tape
41. Using vinyl—cover, complete rear of car with 3m tape
42. Place wood cover over inside of rear window and seat back & tape around all edges to seal off glass & trunk Process Sheet Rack
Stretch Length Hybrid L
Standard Operation Description
1. Center car on track
2. Remove key
3. Disconnect battery
4. Remove rear doors and door wires
5. Jack up car and remove rear tires
6. Unhook emergency brake
7. Unhook exhaust remove exhaust shield
8. Install rear ford bracket in hole in rear frame cross brace
9. Install center pieces of rack fixture
10. Lower car and align rear pin fully seated toward rear
11. Preload frame install 4 ford side brackets and adjust rack bolts
    **Welding clamp location: The welding clamp is to be clamped to a similar material as being welded. (ie. Welding frame clamp to frame—welding body clamp to body) Ground clamp must be within 24-inches of welding area.
12. Weld frame preload body and weld body to rack 8 bolts
13. Install inside racks, rear first and tack. Add front floor support
14. Mark roof cut and index marks—mark floor cut (separate sketch)
15. Cover fuel lines and cut floor for fuel line access use template
16. Cut fuel and brake line from front of bend in lines at rear floor return 3½" fuel 3" brake 2½' and 2".
17. Record squareness readings before & after cutting
18. Cut car and grind welding surfaces
19. Install inner and outer supports
20. Install 1"×2"×⅛" tube in upper roof rail
21. Weld in place with 6⅛" spacing
22. Install inner and outer roof rail and weld
23. Install inner and outer rocker panel and weld
24. Install floor panel and floor support and weld
25. Install roof inner support plate and roof bow
26. Install roof and clamp assembly maintaining roof shape 27. Install second roof bow at drawing location
28. Grind OEM fuel lines and install fuel and brake lines+ bleed system
29. Install fuel line clips (per notes for location)
30. Install rear tires and torque to factory specifications
31. Coat exposed OEM fuel lines with rust preventative material
32. Check for leaks—all lines
33. Install emergency brake cable extension and coupler.
34. Remove brackets. die cut preload belt welds
35. Remove main rack bolts.
36. Grind remaining welds
37. Clean off car—blow off dust
38. Remove vehicle from fixture
39. Place vehicle on lift
40. Install floor tunnel piece and weld in place
41. Hammer factory floor panels up to contact extended floor panels—weld floors together welding clamp location: The welding clamp is to be clamped to a similar material as being welded. (ie. welding frame clamp to frame—welding body clamp to body)
   Ground clamp must be within 24-inches of welding area.
42. Blow off dirt and wipe floors and exhaust clean with 3812
43. Seam seal all welded areas
44. *Check emergency brake for proper clearance
45. Tape exhaust pipe and outside rockers 20" past welded seam areas
46. Spray floors with sound deadening fuser 805 wheel house coating
47. Weld exhaust extensions to exhaust pipe and check alignment
48. Install exhaust shields and exhaust system Process Sheet Door Stretch
Stretch Length Hybrid L
Standard Operation Description
Option One—OEM Glass
1. Set door on table
2. Lay out cut lines from drawings inside and out
3. Install fixture bolt tack weld as needed
4. Cut door with air saw, grind all edges ½"
5. Slide fixture apart 6⅛" and install pins to locate
6. Install lower inside extension weld and grind
7. Install upper inside extension weld and grind
8. Install inside door shell extension weld and grind
9. Turn door over cut out front section of door skin
10. Install upper outside door skin weld and grind
11. Install lower outside door skin weld and grind
12. Glue front and grind all welds
13. Install inner door channel extensions
14. Fabricate new side intrusion beam using factory ends with HSLA steel tubing per drawings Option Two—Long Glass
1. Same procedure as option one less upper outside door skin and upper inside door shell extensions Stamped Door Skin
1. Install outside door skin stamped as one piece and installed on door shell with glue or welded Process Sheet Door Prep
Stretch Length Hybrid L
Standard Operation Description Inside of Door 1. Put doors on stands with inside facing up
2. grind all burred surfaces
3. DA with 80 grit paper all 3 outside edges smooth
4. clean inside of the panel with lacquer thinner
5. rag until dirt and oil are removed
6. repeat operation with special metal prep (360-4)
7. blow off panels to remove excess dirt particles
8. spray one coat of epoxy primer on entire inside of panel (801-1871)
9. allow to flash off
10. seam seal all welded edges inside of panel Outside of Door—Turn Door Over to the Outside Face
1. Clean entire surface with lacquer thinner
2. Rag until all dirt and oil are removed
3. Repeat operation with metal prep (360-4)
4. Grind all welded areas on all edges and obvious dents (use 50 grit)
5. DA with 80 grit paper the rest of the ungrounded panel
6. Tape off body lines so the Bondo does not flow into them
7. Bondo all ground areas and allow to dry
8. DA with 40 grit paper the Bondo cut down to desired height
9. Hand sand with long board and 40 grit paper until straight
10. Hand sand with 80 grit
11. Finish Bondo work with 180 grit
12. Blow off panel and sand off any excess Bondo
13. Clean panel of any dust and apply a thin coat of epoxy primer (801-1871)
14. Allow to flash off
15. Spray on a quart (3 to 4 coats) of polyester filler (1006-23)
16. Panel can be baked in spray booth and ready to sand in 45 minutes
17. When dry, guide coat panels with dark grey lacquer primer (6021)
18. Use 220 grit paper on long board and sand all areas that will show
19. When the set of doors has been sanded, there are usually a number of small dents and dings that are visible—mix ever coat spot putty and fill visible dents and dings
20. Sand spot putty with 220 grit until flat
21. Blow panel off and guide coat again (6021)
22. Repeat sanding operation with 220 grit board sand paper
23. When completed blow off panels and check edges for smoothness
24. Tack cloth off panel and apply 3 coats of finish primer (DP-20)
25. When primer has flashed off, scuff until smooth Final Prep 1. Spray on a guide coat of dark grey lacquer primer (6021)
2. Dry sand all areas that show with 320 grit paper on board
3. (Guide coat again with 6021)
4. Then wet sand same areas with 400 grit wet or dry
5. Repeat operation with 600 grit paper
6. Dry off with a paper towel Process Sheet Vehicle Prep
Stretch Length Hybrid L
Standard Operation Description
1. Tape rear door jams and tape rear dogleg moldings
2. Outline tape quarter panels and doglegs
3. Tape quarter panel at top with 2" tape and rearward 6"
4. Paper and tape rear bumper at quarter panel
5. Paper and tape quarter panel from body line approximately 4 ft to rear taillight
6. Paper and tape upper quarter and carry 6" to roof panel down to tire line
7. Cover complete rear of car from roof to bumper
8. Install inside rear window wooden cover
9. Tape using 2" tape to seal off all openings to protect rear window from overspray
10. Tape safety belt latches 11. Install front cover from roof to front bumper
12. Cover dashboard
13. Install drop cover to protect windshield, steering wheel and lower dash
14. Fasten at top roof rail grooves
15. Tape upper cover to inside roof with 2" tape
16. Fold drop cover over front of windshield and tape to hood cover
17. Tape off any existing holes to protect windshield from overspray
18. Install paper on front doors 1" above moldings ½ way onto door
19. Wrap around inside and tape to front door cover
20. Install front door covers
21. Grind roof at front, rear welds approximately 2" onto new roof and 4" onto OEM roof with 36 grit paper
22. Grind rear pillar at upper weld to roof rail and lower pillar to rockers with 36 grit
23. Install 1 coat of Bondo on roof at ground areas approximately ⅛" thick
24. Let set for 5 minutes
25. Sand areas with 36 grit until new roof is flush with OEM roof
26. Install $2^{nd}$ coat of Bondo 1/16" thick, 8" wide. wait 5 minutes
27. sand with 36 grit to taper Bondo to OEM roof
28. Bondo roof rail at upper pillar and rockers at lower pillar at welded seams
29. Skim coat and let set for 5 minutes
30. Sand with 80 grit to match contours of OEM roof rail and rocker panel
31. Metal glaze upper, lower sanded areas
32. Sand with 80 grit forming to OEM roof rails, rocker
33. Check for porosity
34. Finish sand with 180 grit
35. Check for any porosity again
36. Repeat step 34 above as necessary
37. Scotch brite (red or gray) door jams
38. Blow out all dust and shavings
39. Wipe down inner roof, roof rails and floor with metal cleaner (901)
40. Cover rear tiers with green masking paper
41. Close doors fold paper over doors and tape
42. Prime all bare metal inside and out with epoxy primer (801-1871)
43. Prime all Bondo areas with epoxy primer (801-1871)
44. Let dry for 10 minutes
45. Rescuff rear door jams with (gray or red) scotchbrite
46. Blow off rear door jams
47. Wipe rear door jams off with 901 cleaner
48. Wet floor below rear door jams
49. Seam seal all floor welds
50. Tack rag rear door jam removing all dust particles
51. Paint from b pillar to rear dogleg
52. Paint rear door jams
53. Paint from top of door jam to b pillar
54. Apply 3 to 4 coats 22 line single stage paint and wait 7 minutes between coats (see mixing chart PM-1)
55. Wait 15 minutes and remove all covers previously installed Process Sheet Paint
Stretch Length Hybrid L
Standard Operation Description Masking Procedure 1. Apply 18" masking paper to rear edge of front fender
2. Apply 18" masking paper to front edge of rear quarter
3. Apply 18" masking paper to windshield (3 strips)—adhere ends of paper with 2" tape
4. Place car in spray booth
5. Cover deck lid with plastic—adhered with 2" tape
6. Cover front fenders and hood with plastic—adhered with 2" tape
7. Cover all tires with tire covers
8. Inspect all sanding and taping procedures adjust as necessary
9. Wet down spray booth floor
10. Remove dust from car with blow gun
11. Clean car with prep solvent (901)
12. Apply primer (EP-689) to all bare metal spots Black Cars 1. See spray gun charts for proper usage (SG-1)
2. Apply 2-3 coats diamont base coat to car
3. Let set for 10 minutes between coats at 68 F, final flash 20 minutes.
4. Using 1000-grit sandpaper—sand all blemishes
5. Wet down booth floor
6. Remove particles from car with blow gun
7. Using tack rag—remove all residues from car white cars
1. See spray gund charts for proper usage (SG-1)
2. Apply 3-4 coats diamond base coat to car
3. Let set up 10 minutes between coats at 68 F. Final flash 20 minutes.
4. Using 1000-grit sandpaper—sand all blemishes
5. Wet down spray booth floor
6. Remove particles from car with blowgun
7. Let set 15 minutes
8. Using tack rag—remove all residues from car all other colored cars—paint entire side of car Clear Coat Procedure 1. See spray gun charts for proper usage (SG-1)
2. Apply 2 coats to vehicle
3. Let set up to 5 minutes between coats
4. Black cars—DC 5300 (see mixing chart PM-1)
5. White cars—DC 5300 (see mixing chart PM-1)
6. Blake car at 140 degrees for 45 minutes
7. Let cool 10 minutes
8. Remove all masking paper and tape
9. Remove from booth
10. Complete "quality inspection checklist"

Process Sheet Assembly 1
Stretch Length Hybrid L
Standard Operation Description

Electrical Department

1. Remove key from ignition
2. Disconnect (−) battery terminal
3. Review job order
4. Run all harnesses front to back putting all connectors and clips in their original location then lay down wire tracks
5. Add two wire harnesses for vanity mirrors Test 1. Test all electrical components for functionality Process Sheet Assembly 2
Stretch Length Hybrid L
Standard Operation Description
1. Install padding on floor recesses 2. Install rug from rear of front seats to rear seat base
3. Install OEM rug cut off at rear seat base
4. Install OEM rug front of car
5. Install four kick plates and step plates
6. Install pillar covers
7. Install seat belts and torque to OEM specifications
8. Install side air bags and connect
1. Install rear doors aligning gaps to standards
2. Install OEM door wires and relocate clips as needed
3. Install door rubbers
4. Install door glass
5. Install OEM door panel
6. Install 6" extension door panel
7. Install belt molding with extension
1. Build headliner on bench add 6" extension padding cover assembly
2. Install headliner with vanity mirrors
1. Reinstall factory drive battery
2. Connect all grounds and power cords to original connectors
3. Install all seats torque to OEM specifications Process Sheet Detail
Stretch Length Hybrid L
Standard Operation Description
1. Remove key
2. Disconnect battery
3. Review job order
4. Wash car
5. Remove excess glue from exterior
6. Remove excess glue from interior—caution should be taken with vinyl and leather components
7. Remove all grease pencil marks on interior and exterior parts
8. Vacuum drivers compartment
9. Vacuum rear passenger compartment
10. Clean windows exterior and interior
11. Clean ashtrays
12. Buff exterior of vehicle
13. Wax and polish exterior
14. Inspect exterior paint work check for overspray dirt runs and appearance
15. Install front floor mats
16. Install overlay carpet
17. Clean and vacuum trunk
18. Check spare tire and jack
19. Install exterior emblems

What is claimed is:

1. A method of converting a production hybrid motor vehicle to a hybrid livery motor vehicle having an extended passenger compartment, the method comprising the steps of:
disconnecting a battery of the vehicle;
unplugging a service disconnect from the battery and removing the battery;
removing the vehicle left and right kick panels;
removing B-Pillar covers and upper Pillar covers of the vehicle;
removing the vehicle's seats;
removing the vehicle's seat belts;
removing the vehicle's shoulder harnesses;
unplugging the vehicle's overhead and front vanity minor;
removing the vehicle overhead dome light;
removing the vehicle headliner;
removing the vehicle's carpet
unplugging the vehicle's OEM wiring and repositioning the OEM wiring;
removing the vehicle's rear deck;
removing the vehicle's rear door panels;
removing the vehicle's front step plates;
welding a frame of the vehicle onto a preloaded rack of the production hybrid motor vehicle;
welding a body of the vehicle to the rack;
installing the vehicle's inside racks in the rear and front of the vehicle;
cutting the vehicle's fuel lines and cutting the vehicle's brake lines from front of bend in the vehicle's lines at rear floor;
installing a floor support into the vehicle;
cutting the vehicle;
grinding the vehicle's welding surfaces;
installing the vehicle's inner and outer supports;
installing a 1"×2"×⅛" tube in the vehicle's upper roof rail and welding the upper roof rail into place with 6⅛" spacing;
installing the vehicle's inner and outer roof rails;
installing the vehicle's inner rocker supports;
installing the vehicle's inner and outer rocker panels;
installing the vehicle's floor panels;
installing the vehicle's floor supports;
installing an inner support plate and bow in the vehicle's roof;
clamping the vehicle's assembly to maintain roof shape; and
installing the vehicle's roof bow at drawing location.

2. A method of converting a production hybrid motor vehicle to a hybrid livery motor vehicle having an extended passenger compartment, the method comprising the steps of:
disconnecting a battery of the vehicle;
unplugging a service disconnect from the battery and removing the battery;
removing the vehicle left and right kick panels;
removing B-Pillar covers and upper Pillar covers of the vehicle;
removing the vehicle's seats;
removing the vehicle's seat belts;
removing the vehicle's shoulder harnesses;
unplugging the vehicle's overhead and front vanity minor;
removing the vehicle overhead dome light;
removing the vehicle headliner;
removing the vehicle's carpet
unplugging the vehicle's OEM wiring and repositioning the OEM wiring;
removing the vehicle's rear deck;
removing the vehicle's rear door panels;
removing the vehicle's front step plates;
coating the vehicle's OEM fuel lines with rust prevention material;
removing the vehicle's frame brackets;
removing the vehicle from fixture;
installing the vehicle floor tunnel piece;
welding the vehicle floor tunnel piece in place;
connecting a vehicle floor tunnel piece to extended the vehicle's floor panels;
welding the vehicle floor tunnel piece to the vehicle's floor panels;
seaming the vehicle floor tunnel piece to the vehicle's floor panels;
installing the vehicle's exhaust extension to the vehicle's exhaust pipe;
installing exhaust pipe;
cutting a vehicle inner door with an air saw;
cutting the vehicle door front section of the door skin;
grinding the vehicle door's edges to a ½";
sliding two cut pieces of the vehicle door apart to 6⅛";

installing a lower and upper extensions to the vehicle door and welding the lower and upper extensions and grinding the upper and lower extensions;
installing the upper and lower outside door skins to a vehicle door and welding the upper and lower outside door skins and grinding the upper and lower outside door skins;
installing a vehicle inner door channel extensions;
installing a padding on a vehicle floor recesses;
installing a vehicle OEM rug at rear and front of the vehicle;
installing the vehicle's kick and step plates;
installing the vehicle's pillar covers;
installing the vehicle's seat belts;
installing all fasteners to OEM torque specifications;
installing the vehicle side air bags;
installing the vehicle headliner;
installing the vehicle's rear doors
installing OEM door wires to a vehicle;
installing the vehicle's glass window shields;
installing the vehicle door panel;
installing a 6" door extension panel to the vehicle;
installing a belt molding with extensions to the vehicle;
installing a vehicle drive battery; and,
reconnecting all grounds and power cords to the vehicle.

* * * * *